(12) United States Patent
Spooner

(10) Patent No.: US 10,317,852 B1
(45) Date of Patent: Jun. 11, 2019

(54) PREDICTIVE GUIDANCE FLIGHT

(71) Applicant: National Technology & Engineering Solutions of Sandia, LLC, Albuquerque, NM (US)

(72) Inventor: Jeffrey T. Spooner, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 543 days.

(21) Appl. No.: 14/927,118

(22) Filed: Oct. 29, 2015

(51) Int. Cl.
*G05B 13/02* (2006.01)
*F42B 15/01* (2006.01)
*F42B 15/10* (2006.01)

(52) U.S. Cl.
CPC .......... *G05B 13/026* (2013.01); *F42B 15/01* (2013.01); *F42B 15/10* (2013.01)

(58) Field of Classification Search
None
See application file for complete search history.

(56) References Cited

U.S. PATENT DOCUMENTS

| 2,998,771 | A | * | 9/1961 | Mosier | F41G 7/222 102/213 |
| 5,435,503 | A | * | 7/1995 | Johnson, Jr. | F41G 7/008 244/3.15 |
| 5,811,788 | A | * | 9/1998 | Wicke | F41G 7/306 244/3.1 |
| 5,881,969 | A | | 3/1999 | Miller | |
| 6,037,896 | A | * | 3/2000 | Dekker | F41G 3/142 342/119 |
| 7,513,455 | B1 | * | 4/2009 | Mavroudakis | F41G 7/30 244/3.1 |
| 7,977,614 | B2 | * | 7/2011 | Raviv | F41F 3/04 244/3.1 |
| 8,729,442 | B2 | | 5/2014 | Boelitz et al. | |
| 9,212,870 | B2 | * | 12/2015 | Gate | G05D 1/12 |
| 2006/0130555 | A1 | * | 6/2006 | Workman | G01N 29/0618 73/1.82 |
| 2007/0285304 | A1 | * | 12/2007 | Cooper | B64G 1/007 342/62 |
| 2008/0206718 | A1 | * | 8/2008 | Jaklitsch | F41A 31/00 434/12 |

(Continued)

*Primary Examiner* — Shelley Chen
(74) *Attorney, Agent, or Firm* — Medley, Behrens & Lewis, LLC

(57) ABSTRACT

The various technologies presented herein relate to utilizing predictive guidance during one or more phases of a trajectory flown by an interceptor during interception with a target. The trajectory of the interceptor comprises an initial phase, a predictive phase, and a final phase. The initial phase includes the launching of the interceptor and can be unguided. The predictive phase directs the interceptor towards the target, wherein the predictive phase utilizes predictive guidance to control the trajectory of the interceptor based upon a predicted location of the target relative to the current locations of the target and the interceptor. During the predictive phase, a motor(s) can be cycled on and off, causing a period(s) where the interceptor is being propelled by the ignited motor, and a period(s) where the interceptor is propelled by its own momentum after cessation of power from the motor, e.g., unpowered flight.

19 Claims, 6 Drawing Sheets

(56) References Cited

U.S. PATENT DOCUMENTS

| | | | |
|---|---|---|---|
| 2008/0258004 A1* | 10/2008 | Hasson | F41G 7/2213 244/3.22 |
| 2009/0127377 A1* | 5/2009 | Lam | F41G 3/142 244/3.2 |
| 2010/0198514 A1* | 8/2010 | Miralles | F41G 7/008 701/302 |
| 2012/0314542 A1* | 12/2012 | Ledeczi | G01S 5/22 367/127 |
| 2013/0153707 A1* | 6/2013 | Gate | G05D 1/12 244/3.15 |
| 2014/0197270 A1* | 7/2014 | Morgan | F42B 10/64 244/3.22 |
| 2016/0216075 A1* | 7/2016 | Trail | F42B 5/02 |

* cited by examiner

PREDICTIVE GUIDANCE FLIGHT

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Interceptors are engine-powered devices that are employed to intercept an object in motion. In a conventional system, an interceptor is launched and is guided to a target by a guidance algorithm(s). Such a guidance algorithm(s) can include a plurality of errors which manifest themselves as the interceptor closes in on the target owing to various potential simplifications upon which the conventional guidance algorithm is based. For example, during creation of the guidance algorithm, assumptions can be included such as the interceptor is exposed to a constant gravity throughout its flight, a constant magnitude of thrust is utilized throughout the flight, etc. Hence, errors based upon these assumptions can accumulate over the course of the flight of the interceptor, and accordingly reduce a likelihood of the interceptor hitting the target. Further, to enable timely interception of a target by an interceptor, the interceptor system can have a need for a sufficient payload of fuel to enable flight of the interceptor over a long range to the target, which can accordingly further increase both the size of the interceptor and the cost of the interceptor system.

SUMMARY

The following is a brief summary of subject matter that is described in greater detail herein. This summary is not intended to be limiting as to the scope of the claims.

Various technologies presented herein relate to utilizing predictive guidance during interception of a target, e.g., a meteor, a flying object, a missile, etc., wherein the predictive guidance can supplement a conventional guidance (e.g., parallel guidance) operation being utilized to steer an interceptor to a target. The various embodiments presented herein are configured to guide the interceptor toward the target with a higher degree of accuracy, with less expensive hardware configurations, and/or with better optimization of other desired parameters, than can be achieved with a conventional guidance system.

In an embodiment, the trajectory of the interceptor comprises a plurality of phases, for example, an initial phase, a predictive phase, and a final phase. The initial phase includes the launch phase of the interceptor and can be unguided. The predictive phase can be utilized to direct the interceptor toward a zero effort miss trajectory when switched to the final phase. A zero effort miss trajectory is one in which an intercept with a target will occur when no additional thrust is applied to the interceptor. During the predictive phase a predictive guidance technique is utilized that controls the trajectory of the interceptor based upon a predicted miss distance of the interceptor relative to the target where the point of closest approach is determined by numerically propagating both the target and interceptor to the time of closest approach. While conventional guidance systems can operate based upon predicting the miss distance between the interceptor and the target, the various embodiments presented herein relate to an interceptor operating with a greater degree of non-linearity in the thrust profile that leads to a trajectory in the final phase. Operation with a greater degree of non-linearity in the thrust profile, e.g., compared to a conventional guidance system, enables less expensive hardware designs to be utilized for the interceptor.

By placing the interceptor on a zero effort miss trajectory (or a near zero effort miss) prior to the final phase of an interception, the various embodiments presented herein enable a guidance system to be implemented during the final phase using assumptions that lead to lower cost hardware designs. For example, a thrust during the final phase that is largely parallel to a line of sight of an onboard sensor (e.g., an optical sensor) can be utilized with an interceptor on a near zero effort miss trajectory to account for errors and still provide a successful impact. This can result in a simple mechanical design in which the thrust is applied along the longitudinal axis of the interceptor vehicle. Additionally, the implementation of a zero effort miss strategy for positioning an interceptor for the final phase can enable other benefits such as, without limitation, smaller interceptors, less fuel, different and less expensive hardware configurations, successful impacts with less maneuverable hardware, less expensive or otherwise optimized sensor systems, different sensor configurations and aiming, non-linear force profiles, less certainty in tracking, and overall less expensive interceptor systems.

During the predictive phase, one or more motors utilized during the predictive phase can be cycled on and off, thereby causing a period(s) where the interceptor is being propelled by the ignited motor(s), and a period(s) where the interceptor is propelled by its own momentum after cessation of power from the motor(s), e.g., unpowered, coasting flight. During the predictive phase, navigation data can be received from an external system(s) and from an onboard navigation system(s) for utilization by a guidance system that employs the predictive guidance technique. The external data may, for example, be provided by a radar-based tracking system. The predictive phase is utilized to position the interceptor in readiness for the final phase. The final phase of the trajectory can utilize a traditional guidance operation such as parallel guidance wherein data is acquired in real-time primarily from an onboard system (e.g., a camera locked onto the target) at a high update rate, and can be supplemented with navigation data from an external system. During the final phase the interceptor can be actively powered throughout to intercept the target during the final phase of flight of toward the target.

The predictive guidance operation can be computationally intensive due to, for example, numerically propagating the interceptor and target to the point of closest approach. Additionally, multiple perturbations from the nominal interceptor trajectory can be generated to determine a set of parameters that puts the interceptor on a near zero effort miss trajectory when switching to the final phase. Hence, a guidance system which generates and evaluates the trajectories can operate with a low sampling rate, e.g., 1 Hz, compared to a higher sampling rate, e.g., 100-200 Hz, utilized during the final phase. While improvements over time in onboard computing power can increase the cycle rate for algorithm executions, the predictive guidance approach utilized in the various embodiments presented herein enable a successful intercept to be achieved at lower update rates of an onboard guidance system and, further, non-linear thrust profiles to be utilized during the predictive phase of the trajectory.

The guidance system can generate a plurality of possible trajectories for the interceptor to follow to intercept the target based on a set of selectable guidance parameters.

Selection of the best trajectory can be based upon a cost function. In addition to minimizing the miss distance, the cost function can be defined to also affect any of the intercept altitude, the intercept trajectory that best allows sensors to operate correctly, or any other characteristics that would lead to a successful intercept. Exemplary guidance parameters include thrust angle, thrust duration, thrust magnitude, coast duration, aileron position, etc.

In an example embodiment of the present invention, the predictive phase can be initiated at, or prior to, cessation of a motor (e.g., a first motor, a first fuel portion, etc.) utilized to launch the interceptor. The predictive phase continues to operate throughout one or more coast periods. The final phase can then be initiated at the activation of an onboard device, e.g., an optical camera, when the target is within range enabling the camera to detect the target. The final phase can continue to use camera measurements up to the time of impact with the target.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
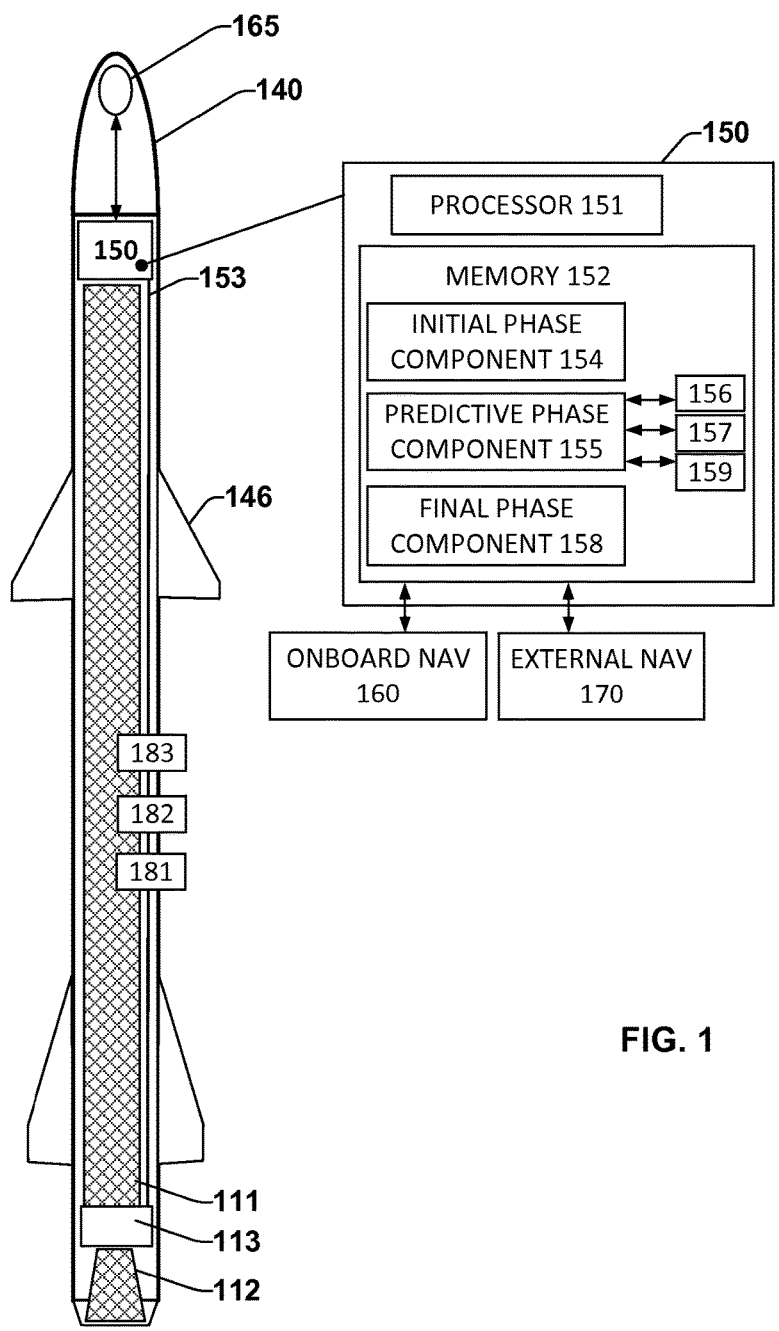
FIG. 1 illustrates an interceptor, according to an embodiment.

Various technologies pertaining to utilizing predictive guidance for controlling a trajectory of an interceptor are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

The various embodiments presented herein relate to utilizing a predictive guidance system for a portion of a trajectory (flight path) of an interceptor to enable a reduction in the complexity of an interceptor system, reduce cost of the interceptor system, and increase likelihood of a single shot kill probability for the interceptor intercepting a target, wherein a target can be any of a missile, a meteor, a flying object, etc.

In an embodiment, the trajectory of the interceptor can comprise a plurality of phases, for example, an initial phase, a predictive phase (divert phase, intermediate phase), and a final phase. The initial phase includes the initial, launch phase (boost phase) of the interceptor. The initial phase can be an unguided portion of the trajectory and is utilized to launch the interceptor.

The predictive phase can be utilized to direct the interceptor on an optimized trajectory towards the target, wherein the predictive phase utilizes a predictive guidance technique that controls the trajectory of the interceptor based upon a future (predicted) location and trajectory of the target and the future (predicted) desired location and trajectory of the interceptor. The future location and trajectory of the target and the future desired location and trajectory of the interceptor can be determined based upon a current location and trajectory of the target, and a current location and trajectory of the interceptor. The desired location and trajectory of the interceptor can be optimized for a successful impact between the interceptor and the target. The optimization for a successful impact can include determining the future desired trajectory of the interceptor, and positioning the interceptor so that a final phase is able to successfully implement an impact. As an example, a desired location and trajectory for the interceptor can implement a zero effort miss for the final phase of flight. A zero effort miss trajectory indicates that the interceptor will collide with the target even if there is no additional thrust applied to the interceptor during a final portion (e.g., final phase) of the flight.

By calculating a desired trajectory that results in a zero effort miss, any errors that occur during the predictive phase (including, for example, errors in tracking the target, errors in tracking the interceptor, differences in actual versus expected trajectory, etc.) can be accounted for during the interceptor's final flight phase using a higher rate guidance system. A zero effort miss trajectory can be an optimized trajectory for a longitudinal thruster, and other trajectories can be used for a desired trajectory for use with other types of hardware configurations.

During the predictive phase, navigation data can be received from an external navigation system(s) and from an onboard navigation system(s) for utilization by the predictive guidance technique. The predictive phase is utilized to position the interceptor in readiness for the final phase. During the predictive phase, one or more motors utilized during the predictive phase can be cycled off and on, thereby causing a period(s) where the interceptor is being propelled by the ignited motor, and a period(s) where the interceptor is propelled by its own momentum after cessation of power from the motor, e.g., unpowered, coasting flight. Further, during the predictive phase, the one or more motors can have periods of operation where the motors undergo materially lessened thrust.

The final phase of the trajectory can utilize a parallel guidance technique wherein data is acquired in real-time primarily from an onboard system (e.g., a camera locked onto the target) and also from an external system. The final phase can be powered, e.g., the interceptor is actively powered throughout to intercept the target during the final phase of flight of the interceptor. Hence, while the predictive phase is configured to position the interceptor with a zero effort miss condition (e.g., with unpowered flight) during the final phase, the final phase can be powered. Accordingly, while the predictive phase calculations assume no thrust for the final phase, and those calculations drive the interceptor towards the desired trajectory, the no thrust assumption may only utilized for optimization during the predictive phase, and the final trajectory can have thrust.

FIG. 1 illustrates an interceptor 100, wherein the interceptor 100 comprises a fuel tank 111 which is configured to store and supply a fuel. A motor 112 (e.g., an engine, a rocket, etc.) is included in the interceptor 100 and is powered by the fuel supplied by the fuel tank 111. The interceptor 100 can further include a motor control system 113 which controls operation of the motor 112, e.g., ignition of the motor 112, cessation of operation of the motor 112, a valve(s) to supply and curtail supply (e.g., temporary cessation during the predictive phase) of fuel from the fuel tank 111 to the motor 112, etc. The motor control system 113 operates based upon a signal(s) received from a main, on board, control system, as further described herein.

The motor 112 can be any suitable propulsion system to enable application of the various embodiments presented herein. For example, the motor 112 can be a constant thrust motor, a variable thrust motor, etc. In a further example, the motor 112 can be a solid fuel propulsion system, a liquid fuel propulsion system, etc. Depending upon the distance travelled, and the trajectory of the interceptor 100, the interceptor 100 can operate in endoatmospheric conditions, exoatmospheric conditions, or a combination thereof. Further, the interceptor 100 can be launched from the ground, from a waterborne vessel (e.g., a ship, a submarine, etc.), or from an airborne system (e.g., an aircraft).

The interceptor 100 further comprises a warhead 140. In an embodiment, the warhead 140 can be an armed device, e.g., a nuclear warhead. In another embodiment, the warhead can be a kinetic energy warhead. One or more sets of ailerons 146 can be included in the interceptor 100, wherein the ailerons 146 can be utilized in conjunction with the motor 112, to steer the interceptor 100 during its flight.

A guidance system 150 can further be included in the interceptor 100. The guidance system 150 includes a processor 151 and a memory 152. The memory 152 includes components that are executable by the processor, wherein functionalities of the processor 151, when executing the components, are described below. A communications bus 153 can be incorporated into the interceptor 100 to enable communication(s) between any and/or all of the guidance system 150, the control system 113, an onboard sensor(s), etc.

The guidance system 150 is in communication with one or more systems that provide data which can be utilized by the guidance system 150 (e.g., by the processor 151) to guide the interceptor 100 to a target. In an embodiment, the one or more systems can include an onboard navigation system 160, wherein the onboard navigation system 160 can be configured to generate and/or process navigation data for the interceptor 100. The navigation data can be generated by an onboard sensor(s) 165, which can include one or more of an infrared camera, a visual camera, a thermal imaging camera, a radar system, an inertial measurement unit, a gyroscope, an air speed sensor, an altimeter, etc.

In another embodiment, the one or more systems can include an external navigation system 170, wherein the external navigation system 170 can be configured to receive and/or process navigation data (e.g., ground segment data, relative position data) from external systems such as a ground based radar system, a satellite based radar system, a global positioning system (GPS), etc., wherein such external systems are remotely located from the interceptor 100. Navigation data generated and/or processed by the onboard navigation system 160 and/or the external navigation system 170 can be stored in the memory 152 for subsequent retrieval and/or processing by the processor 151.

Figure 2:
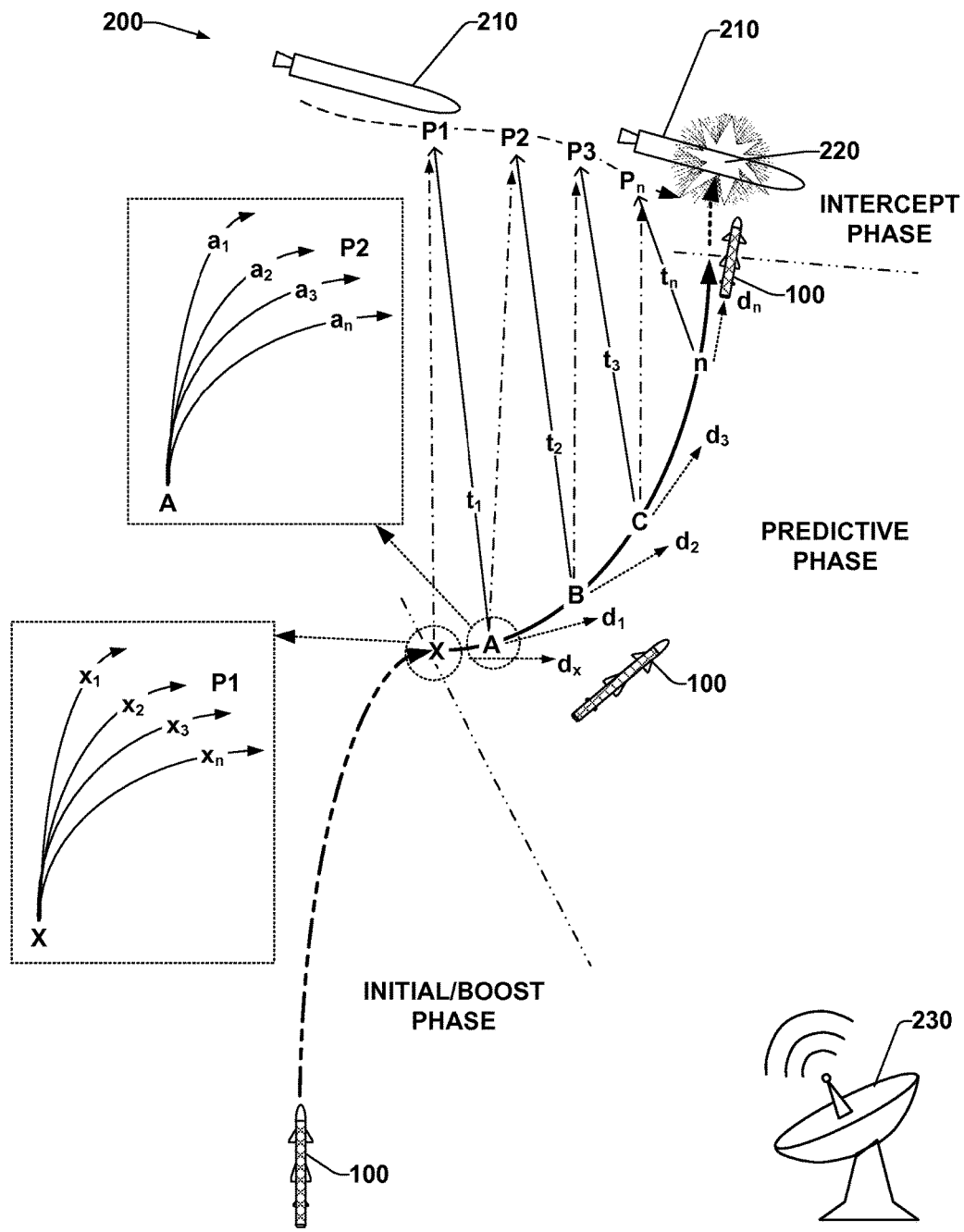
FIG. 2 is a schematic illustrating a trajectory of an interceptor and phases included in the trajectory.

To facilitate further understanding of the various components of the guidance system 150, FIG. 1 can be read in conjunction with FIG. 2, wherein FIG. 2 illustrates a schematic of a trajectory 200. The trajectory 200 comprises a plurality of phases undertaken during flight of the interceptor 100 in engaging a target 210, wherein the target 210 can be an enemy missile, for example, with interception of the flight path of the interceptor 100 and the target 210 occurring at position 220. As previously mentioned, the warhead 140 of the interceptor 100 can be a kinetic warhead, wherein the target 210 is destroyed upon impact of the interceptor 100, e.g., a kinetic kill.

As shown in FIG. 2, the trajectory 200 can be separated into three phases, an initial, boost phase, an intermediate, predictive phase, and a final, interception phase. During the initial phase the interceptor 100 is launched (e.g., from a ground based launching system), wherein the motor 112 is ignited and fueled by the fuel tank 111. Throughout the initial phase, the interceptor 100 can have an unguided flight wherein the interceptor 100 is spin stabilized during the initial phase. Control of the flight of the interceptor 100 during the initial phase may comprise limited instruction from the guidance system 150 (e.g., when compared with a plurality of instructions transmitted during the predictive phase). An initial phase component 154 is included in the memory 152 and is executed by the processor 151, wherein the initial phase component 154 comprises instructions for ignition and operation of the motor 112. For example, the initial phase component 154 can include instructions for the initial phase, wherein an instruction 181 can be generated and transmitted on the bus 153 to the control system 113 to ignite the motor 112, whereupon the interceptor 100 is launched. As mentioned during the initial phase, the interceptor 100 can fly in an unguided manner, wherein, upon launch, the interceptor 100 may not be pointing in the direction of the target 210.

A predictive phase component 155 is included in the memory 152 for execution by the processor 151 during the predictive phase of the trajectory 200. The predictive phase component 155 can include instructions to control navigation of the interceptor 100, wherein the predictive phase component 155 can execute a cost function 156 during the predictive phase of operation. The predictive phase component 155 can identify control parameters 157 (guidance parameters) based upon the output of the cost function 156, wherein the identified control parameters 157 cause a predefined cost function 156 to be within an acceptable tolerance(s). The identified cost function(s) 156 can correspond to a predicted point of impact of the interceptor 100 and the target 210 at a predicted time in the future, a predicted trajectory of the interceptor 100 as it nears the target 210, etc. In a non-limiting example, the identified cost function 156 can include a tolerable amount of "miss" in the X direction and a tolerable amount of "miss" in the Y direction at a predicted point of impact, as further described below. In other non-limiting examples, a cost function 156 can be utilized to optimize any of impact at a certain altitude, impact at a certain location, interceptor movement in a direction more likely to cause an impact, interceptor orientation that optimizes functionality of a sensor(s) (e.g., an onboard camera) to function correctly, trajectory determination to best account for likely areas of error in tracking or flight trajectory, or any other characteristic(s) that would lead to a successful outcome of a flight of the interceptor 100.

The point of impact 220 is a function of the control parameters 157, thus, the predictive phase component 155 iteratively modifies the control parameters 157 until the tolerances of the cost function 156 parameters are met (e.g., a zero effort miss condition is achieved).

As previously mentioned, during flight of a conventional interceptor system, the conventional interceptor is powered throughout its flight, which can result in a large and costly interceptor. As well as being powered throughout its flight, a conventional interceptor system also utilizes a parallel guidance system to enable targeting, and interception of a target. A parallel guidance system comprises a plurality of algorithms operating with real-time data, wherein the real-time data is being received from any of on board sensors (e.g., a camera) and/or remote systems (e.g., a ground-based radar system 230). Effectively, a conventional interceptor is locked-on to the target and is adjusting its flight relative to the target in a rapid manner, wherein such flight adjustments can be performed to address the error(s) in the conventional algorithms, as previously described. During such locked-on operation, a processor operates at between about 100 Hz and 200 Hz when processing the real-time data.

Rather than powering the interceptor 100 for the whole duration of the predictive phase (and hence, the whole trajectory per a conventional interceptor), per the various embodiments herein, the interceptor 100 can undergo powered flight for at least one portion of the predictive phase and can further undergo at least one unpowered flight portion (a coasting portion) or a flight portion powered differently than a conventional flight system, such as a lessened power on a portion of a trajectory (e.g., trajectory 200). In an example, the motor 112 can, upon initiation of the predictive phase, be ignited and operated until fuel in the fuel tank 111 has been depleted (or flow is terminated, e.g., by a valve), whereupon the motor 112 ceases operation and the interceptor 100 undergoes coasting (non-powered) flight until commencement of the final phase of the trajectory 200. In another example, upon commencement of the predictive phase of the trajectory 200 the motor 112 can cycle through a number of instances of the motor being turned on and off, with each motor ignition period interspersed with a motor off period during which the interceptor 100 undergoes coasting motion resulting from the inertia supplied by the preceding period of motor ignition. In another embodiment, the motor can cycle through one or more combinations of a higher thrust state(s) and/or a lower thrust state(s), resulting in a non-linear flight control of the interceptor 100.

Upon completion of the initial phase, the interceptor 100 can transition from the initial phase to the predictive phase. As mentioned, contrary to a conventional interceptor where the conventional interceptor undergoes powered flight throughout its flight, the interceptor 100 can undergo powered flight (e.g., operation of the motor 112) only for a portion(s) of the predictive phase of the interceptor 100 trajectory. As previously mentioned, during the predictive phase of the trajectory 200, the predictive phase component 155 executes one or more predictive guidance algorithms (e.g., based upon the cost functions(s) 156 and the guidance parameter(s) 157), wherein predictive guidance relates to predicting a future position of the target 210 based upon a calculated future position(s) of the target 210, and a calculated future desired position of the interceptor 100, wherein the interceptor 100 is steered towards the future position of the target 210 in an optimized trajectory.

In an embodiment, the guidance system 150 is configured to determine one or more future positions of the target 210 based upon its previous positions (e.g., its previous flight path). For example, at position X of FIG. 2, the interceptor 100 transitions from initial phase flight to predictive phase-based flight, wherein at position X, as a function of the unguided initial phase flight, the interceptor 100 is travelling in direction $d_x$.

As previously mentioned, during the predictive phase, the guidance system 150 can receive navigation data from an onboard navigation system(s) 160 and/or an external navigation system(s) 170. The onboard navigation system 160 can provide information regarding the flight (e.g., trajectory, direction, speed, position, etc.) of the interceptor 100, and the external navigation system 170 can provide flight information for both the interceptor 100 and the target 210 (e.g., from navigation data received from the ground based radar system 230). Hence, at position X, the predictive phase component 155 can operate on the flight data received from both the onboard navigation system 160 and the external navigation system 170 to provide a prediction of a position P1 of the target 210 and a position A at a time $t_1$ such that the position of the interceptor 100 is being narrowed down to facilitate the kinetic kill of the target 210 at the position 220.

As mentioned, the guidance of the interceptor 100 to the position 220 can be based upon the one or more cost functions 156 (and any associated cost variables). For example, cost functions 156 can be based upon a three dimensional (3D) co-ordinate system having X-, Y-, and Z-axes, wherein the interceptor 100 is flying along the Z-axis, the X-axis is in the vertical (up/down) direction, and the Y-axis is the horizontal axis (e.g., left/right). XY form a perpendicular plane to the Z-axis trajectory. One of the cost functions 156 which can be optimized is a missed distance between the interceptor 100 and the target 210 in the X-axis. Another cost function 156 which can be optimized is a missed distance between the interceptor 100 and the target 210 in the Y-axis. Further, one or more degrees of freedom can be applied to a respective guidance parameter 157 operating on a cost function 156, such as an altitude above which the interception of the target 210 is to occur, e.g., the interception is to occur at a height that is exoatmospheric.

The predictive phase component 155 can be configured to generate a matrix 159 based upon the cost functions 156 and the guidance parameters 157. For example, when minimizing cost based upon two cost functions, e.g., X-axis miss and Y-axis miss, the matrix 159 can have an order of 2× the number of guidance parameters 157. In another example, where the interception is to occur at or above a particular altitude, then a Z-axis miss can be added to the cost functions 156 and the matrix 159 can have an order of 3× the number of guidance parameters 157. During the predictive phase, the trajectory of both the interceptor 100 and the threat 210 are propagated forward in time to the point of closest approach using the plurality of guidance parameters 157. In addition, perturbations of the guidance parameters are considered and the trajectory of the interceptor 100 is propagated to a point of closest approach (e.g., position 220) relative to the trajectory of the threat 210 given the perturbed guidance parameters 157. As mentioned, the guidance parameters 157 can include such features as thrust angle, thrust duration, thrust magnitude, coasting period (dwell time), aileron position, etc. Given this information, the guidance parameters 157 can be adjusted to minimize a value(s) for the cost functions 156. A primary cost function in the set of cost functions 156 is typically a miss distance of the interceptor 100 relative to the threat 210, however, other considerations such as intercept altitude and angle of approach with respect to the sun may also be considered if there exists sufficient guidance parameters 157 that may be adjusted. Due to the computational complexity of generating the various possible trajectories, the predictive guidance component 155 may be run at a low sample rate, e.g., about once per second (1 Hz).

During generation of the matrix 159, a plurality of possible trajectories can be generated, trajectories $x_1$-$x_n$ shown in FIG. 2, which can be generated when the interceptor 100 is at position X. A first trajectory $x_1$ can be generated, wherein the trajectory $x_1$ can be generated based upon a particular first thrust condition. A second trajectory $x_2$ can be generated, wherein the trajectory $x_2$ can be generated based upon a particular second thrust condition. A third trajectory $x_3$ can be generated, wherein the trajectory $x_3$ can be generated based upon a particular third thrust condition. An $n^{th}$ trajectory $x_n$ can be generated, wherein the trajectory $x_n$ can be generated based upon a particular $n^{th}$ thrust condition, where n is an integer greater than 1. For each trajectory the predictive phase component 155 can be configured to determine a value for the cost function 156 (e.g., chance of missing the target) for each of the trajectories wherein the cost function 156 can be equivalent to the interceptor 100 being pointed in a particular direction, and having a particular trajectory with the lowest probability of the interceptor 100 missing the target 210 (e.g., which trajectory will have a highest probability of a zero effort miss?).

Accordingly, the respective trajectories $x_1$-$x_n$ can be reviewed to determine which of the trajectories has the smallest miss distance. For example, it is determined that trajectory $x_2$ has the smallest miss distance in the X-axis and Y-axis directions, and based thereon, the predictive phase component 155 generates the trajectory $x_2$ from which the guidance system 150 generates an instruction 182 configured to control thrust of the motor 112, an alignment of the ailerons 146, etc. The process of generating possible trajectories and selecting (e.g., by the guidance system 150) a trajectory to be implemented on the interceptor 100 can be performed repeatedly throughout the duration of the predictive phase. For example, with the interceptor 100 following the trajectory $x_2$, the interceptor 100 is now positioned at point A, whereupon the guidance system 150 (in conjunction with the predictive phase component 155) re-performs generation of a plurality of trajectories based upon the interceptor 100 being at point A and the target 210 being at position P1 (e.g., at $t_1$, as previously described), for which a cost is respectively determined for each of the newly generated trajectories, and the lowest cost trajectory is selected therefrom. For example, as shown in FIG. 2, at position A, a plurality of new potential trajectories $a_1$-$a_n$ can be generated and reviewed to determine which of the trajectories has the smallest miss distance. For example, it is determined that trajectory $a_3$ now has the smallest miss distance in the X-axis and Y-axis directions, and based thereon, the predictive phase component 155 generates an updated instruction 182 configured to control thrust of the motor 112, an alignment of the ailerons 146, etc., with the conditions identified for trajectory $a_3$.

The continued generation of trajectories and trajectory selection enables the interceptor 100 to be steered along a trajectory 200 that is continually being updated and/or modified in response to a predicted position (and actual position) of the target 210 changing as the target 210 undergoes its own trajectory. Hence, the guidance system 150 can generate new trajectories, and select a trajectory therefrom, at each of the positions X, A, B, C, n, etc., with the target 210 at respective positions P1, P2, P3, Pn as predicted per timings $t_1$, $t_2$, $t_3$, $t_n$. It is to be appreciated that while only five positions of the interceptor 100 are indicated to be where the guidance system 150 performs the generation of potential trajectories, and selection therefrom, the guidance system 150 can perform the trajectory generation and selection throughout the duration of the predictive phase.

It is to be appreciated that the guidance system 150 is not limited in selecting a trajectory from the plurality of generated trajectories, the guidance system 150 can also generate a trajectory to be applied to the interceptor 100 based upon information obtained from a plurality of generated trajectories. For example, if a particular, first thrust direction generates a trajectory having a heading in a particular, first heading direction, the guidance system 150 can utilize that information and determine that a second thrust direction that mirrors (e.g., having an equal but opposite magnitude) the first thrust direction can cause a trajectory to go in a second heading direction that mirrors the first heading direction. Accordingly, for a potential trajectory that was generated with a plurality of variables (e.g., thrust magnitude, thrust direction, thrust duration, etc.) it is possible to know that a second potential trajectory exists if the plurality of variables are given opposite values, e.g., instead of a thrust of 10° being utilized, a potential trajectory with a thrust of −10° can be derived. Hence, not every potential trajectory has to be calculated, and rather, a plurality of potential trajectories can be generated from which knowledge of a plurality of other (uncalculated) potential trajectories can be derived, e.g., in an approach similar to a Taguchi methodology, or similar operation.

In another embodiment, a first trajectory can be propagated forward given a nominal set of parameters (as determine from a previous predictive guidance computation) to obtain a trajectory $x_0$. A plurality of other possible trajectories can then be propagated based on perturbations of each adjustable parameter to obtain trajectories $x_1$-$x_n$ where there are n adjustable parameters (e.g., parameters 157). From the plurality of possible trajectories it is possible to determine how variation in one or more parameters comprising the set of parameters $x_1$-$x_n$ affects the cost function 156. Based thereon, a combination of all the parameters that minimizes the cost function (e.g., minimizes the zero effort miss distance) are selected and a new trajectory (e.g., $x_{applied}$) based upon the selected parameters is generated at the guidance system 150. Any flight conditions, e.g., thrust magnitude, thrust direction, fuel valve open/close, etc., can be compiled in an instruction 182 and forwarded to the control system 113 to enable steering the interceptor 100 on the new trajectory. Upon application of the new trajectory, $x_{applied}$, the guidance system 150 (in conjunction with the predictive phase component 155) can utilize the conditions and/or settings of parameters 157 configured in the new trajectory, $x_{applied}$, and then generate a plurality of other possible trajectories that can be propagated based on another round of perturbations of each adjustable parameter to obtain a new set of possible trajectories $x_1$-$x_n$. Based thereon, a combination of all the parameters that minimize the cost function once more are selected and a new trajectory (e.g., $x_{applied2}$) based upon the selected parameters is generated at the guidance system 150.

In another example of the plurality of trajectories that can be generated based upon a predicted future position of the target 210 for a given position of the interceptor 100 (e.g., at any of the positions X-n), a first trajectory can be calculated based upon a first coast period having a duration of x seconds. Further, a second trajectory can be calculated based upon a second coast period having a duration of x+1 seconds. An $n^{th}$ trajectory can be calculated based upon a $n^{th}$ coast period having a duration of x+n seconds. For example, the first trajectory has a calculated miss distance of 30 meters, the second trajectory has a calculated miss distance of 10 meters, and the $n^{th}$ trajectory has a calculated miss distance of 20 meters. Thus the predictive phase component 155 utilizes the second predicted trajectory for the flight trajectory (unless the target 210 veers from its current course, wherein a new series of trajectories are predicted).

The predictive phase component 155 can update the predicted trajectories in accordance with newly received navigation data from the onboard navigation system 160 and the external navigation system 170. For example, as the target 210 veers away from a current trajectory, the predictions for a future location of the target 210 can be updated, and further, a plurality of newly predicted trajectories for the interceptor 100 to follow can be generated in response to the target 210 changing direction and once again, cost estimate analysis (e.g., based upon cost functions 156) can be executed across the plurality of predicted trajectories for the interceptor 100 to identify the lowest cost trajectory, e.g., lowest chance of a miss in the X-axis and the Y-axis as defined in the cost functions 156. As the predictive phase component 155 predicts a trajectory, the guidance system 150 can continue to control operation of the motor 112 by generating and transmitting further instructions 182 to control the thrust angle, etc., of the motor 112.

To enable predictive guidance of the interceptor 100 during the predictive phase, the predictive phase component 155 can utilize the plurality of guidance parameters 157 (e.g., which can be combined into a predictive model) to generate one or more values for the cost functions 156.

As shown in FIG. 2, as the interceptor 100 is guided through its trajectory as a function of the predictive guidance the interceptor 100 undergoes a plurality of heading changes as it is being steered, e.g., directions $d_x$-$d_n$, wherein the heading $d_n$ has a zero effort miss (e.g., during the final phase). Hence, with reference to FIG. 2, in response to predicting that the threat 210 will be at position P1, the guidance system 150 generates an another instruction 182, instructing the motor 112 to ignite for a prescribed period of time to steer the interceptor 100 in the direction $d_1$ to position A.

In a further example, as described below, during the final phase of the trajectory 200 (the interception phase) steering of the interceptor 100 can be based upon the optical sensor 165. Hence, in anticipation of the final phase occurring, a cost variable 156 can be applied wherein an angle of interception between the interceptor 100 and the target 210 prevents the optical sensor 165 from being pointed towards the sun during the final phase.

The guidance system 150 further comprises a final phase component 158 which executes one or more parallel or other conventional guidance algorithms to provide final guidance of the interceptor 100 to the target 210, e.g., when the interceptor 100 is within a kill range, zero miss distance of the target 210. In an embodiment, as previously mentioned, transitioning from the predictive phase to the final phase can be at the time the interceptor 100 has a trajectory having a zero effort miss condition, or as close thereto with the understanding that the target 210 and the interceptor 100 are both in motion (e.g., the target 210 may be undergoing a seemingly erratic trajectory to prevent simple lock-on of the trajectory of the target 210 by the interceptor 100). In an embodiment, the transition from the predictive phase to the interception phase can occur at about 10 seconds prior to a predicted time of interception (e.g., based upon the interception position 220), wherein the predicted time of interception can be generated by the predictive phase component 155, e.g., as a function of a sensing range of an onboard sensor 165.

Unlike the predictive phase and the motor 112 being cycled through a plurality of ignition periods and coast periods, during the interception phase the motor 112 can be instructed to remain ignited for the duration of the interception phase, wherein the guidance system 150 (e.g., via the final phase component 158) can generate and transmit an instruction 183 to the control system 113 to maintain ignition of the motor 112. Further, during the parallel guidance phase the final phase component 158 can be configured to utilize navigation data generated by the onboard navigation system 160 and onboard sensors, e.g., information provided by the optical sensor 165. In an embodiment, the transition from the predictive phase to the final phase can be a function of one or more operating capabilities of the onboard sensors. For example, an aperture of the optical sensor 165 limits how far away the onboard navigation system 160 can resolve the target 210. Hence, the aperture of the optical sensor 165 limits the final phase to be about 10 seconds prior to impact. Owing to the predictive guidance operation being comparable to the locked-on operation of a conventional missile, during the final phase, the final phase component 158 can be processed at a sample rate of 100-200 Hz.

It is to be appreciated that while the various operations pertaining to any of the first phase, the second phase, and/or the third phase are presented herein as being performed by the onboard guidance system 150, the various operations can be offloaded to an external system (e.g., a computing system located at the radar system 230), for calculations to be performed at the external system and results thereof transmitted back to the guidance system 150. Hence, computational burden at the guidance system 150 can be offloaded to an external computing device.

Figure 3:
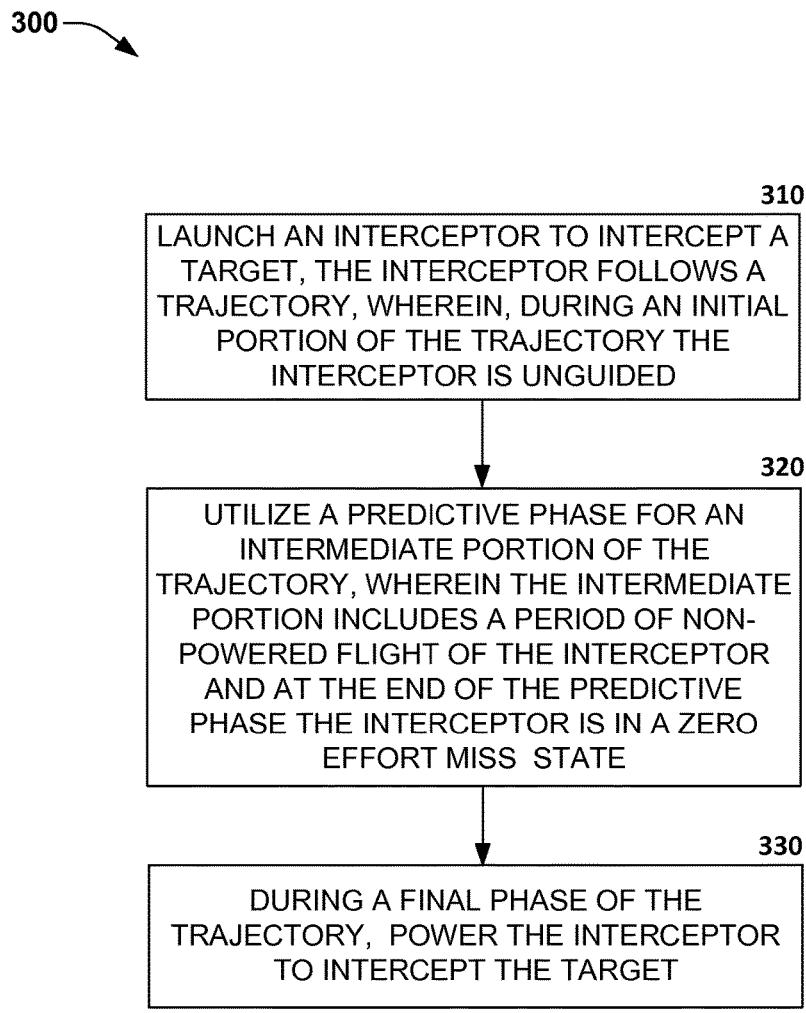
FIG. 3 a flow diagram illustrating an exemplary methodology for control of an interceptor during its flight.
Figure 4:
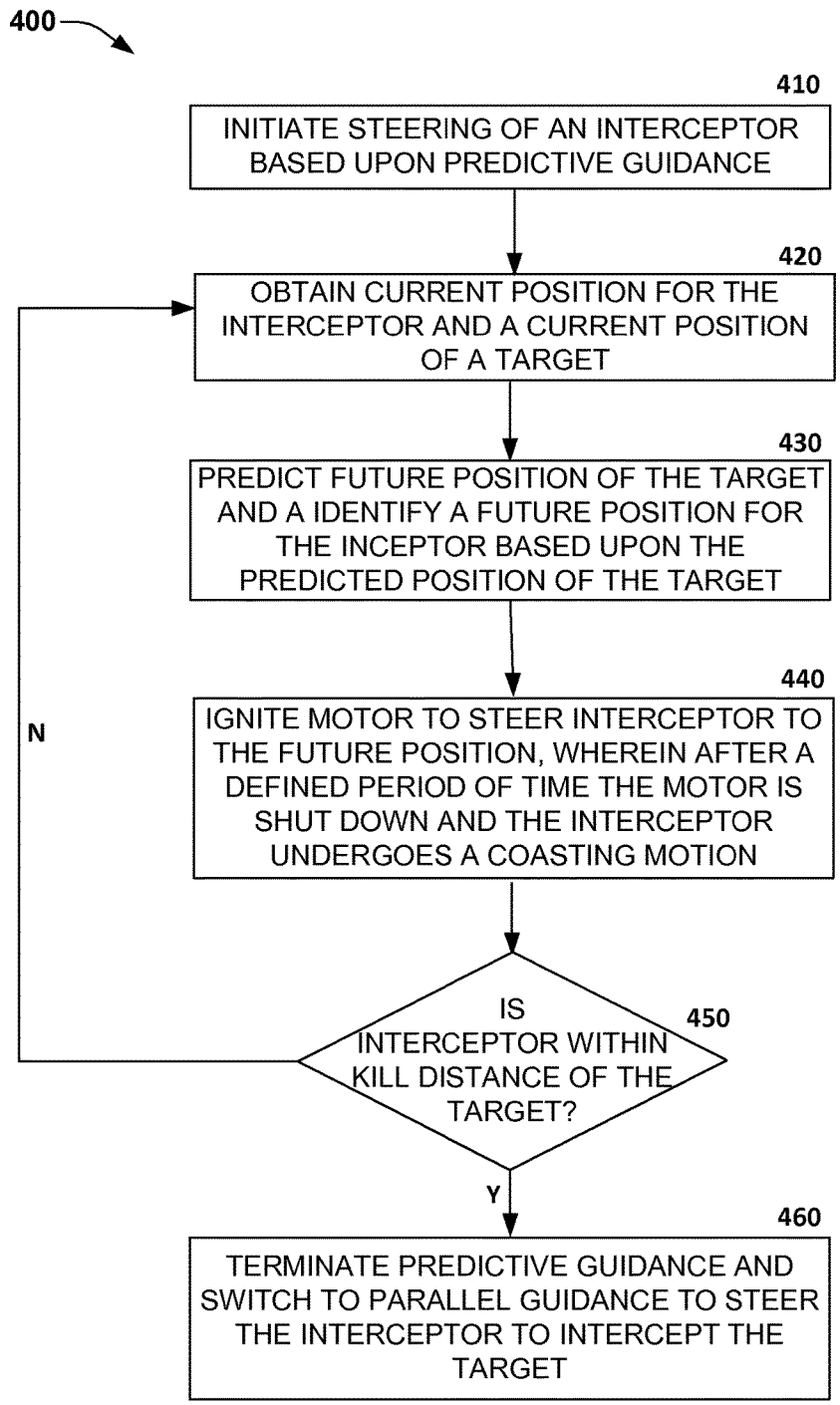
FIG. 4 is a flow diagram illustrating an exemplary methodology for control of an interceptor during its flight.
Figure 5:
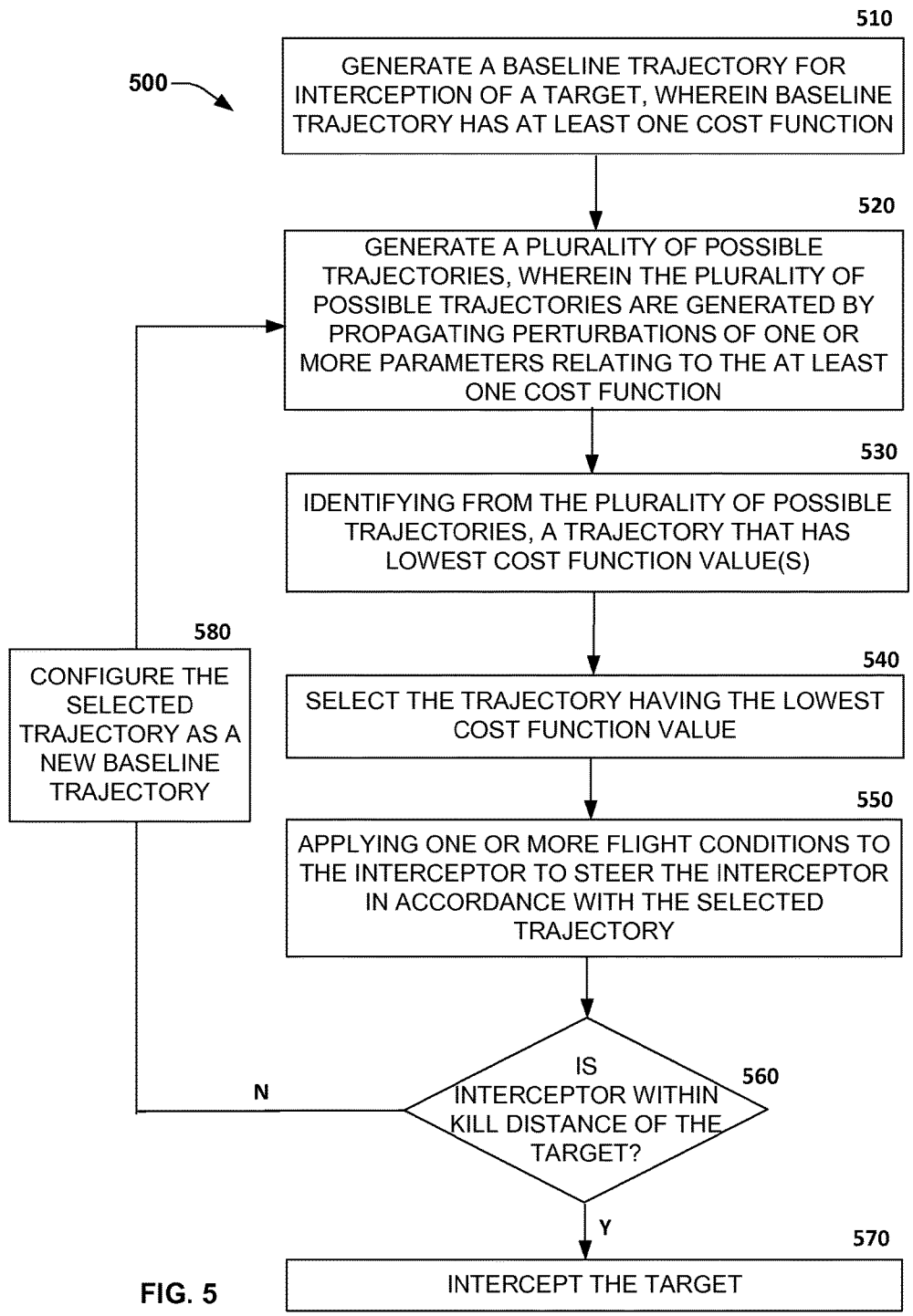
FIG. 5 is a flow diagram illustrating an exemplary methodology for control of an interceptor during its flight.

FIGS. 3-5 illustrate exemplary methodologies relating to utilizing predictive guidance during interception of a target. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein FIG. 3 illustrates a methodology 300 for utilizing different control methods during flight of an interceptor to a target. At 310, the interceptor is launched, and is to follow a trajectory to intercept the target. The trajectory can comprise three phases (or stages), a launch phase, a predictive phase, and a final, intercept phase. In an embodiment, a single motor can be utilized for the entirety of the trajectory. In another embodiment, one or more phases can be respectively powered by one or more separate motors. Ignition of a motor powering the interceptor can be performed in response to receiving an ignition signal from a guidance system located on the interceptor.

At 320, upon completion of the launch phase (e.g., upon depletion, or prior thereto, of a first portion of fueling of the motor, attaining a particular altitude, attaining a particular velocity, attaining a particular gravitational force, etc.), the interceptor enters the predictive phase of the trajectory. During the predictive phase, at respective positions of the interceptor along its trajectory, a predictive guidance process can be utilized to determine a desired trajectory for the interceptor to follow. The guidance system can compute a plurality of trajectories for the interceptor at a future point in time, wherein the plurality of trajectories can be based upon a computed trajectory of a target at the future point in time. The guidance component can select from the plurality of computed trajectories, a trajectory having a cost function related to the desired trajectory, e.g., the highest probability of the interceptor intercepting the target, a lowest zero miss cost. As previously mentioned, the trajectory generation and trajectory selection can be repeated throughout the predictive phase, hence the predictive guidance process is controlling the interceptor to traverse a trajectory that is being continually updated to account for any changes in the location and/or direction of the target, aligning the interceptor so that onboard sensors are correctly aligned for a final phase approach, achieving a zero miss condition, etc.).

For a portion of the predictive phase the interceptor can be powered by the motor, and for another portion of the predictive phase operation of the motor can be ceased such that the interceptor travels as a function of its momentum. A plurality of control signals can be generated by the guidance system for controlling the motor, wherein the plurality of control signals include ignite the motor (e.g., along with other conditions such as a thrust angle) and cease operation of the motor.

At 330, when the interceptor is at a desired distance from the target, the predictive phase can be terminated and the final phase initiated. During the final phase the motor can be re-ignited to propel the interceptor to the target. Ignition of the motor can be in response to a control signal received from the guidance system. The distance at which ignition is calculated to occur can be based upon any suitable parameter and/or condition, such as an operating range of an onboard sensor, e.g., based upon an aperture and other specifications of an onboard camera. During the final phase, steering of the interceptor towards the target can be performed by utilizing a parallel guidance process. As previously described, during a predictive phase of navigation, a guidance system onboard the interceptor can be operating at a lower sampling rate during the predictive phase than a sampling rate that is utilized during the final phase. For example, during the predictive phase a sampling rate of 1 Hz can be utilized, while during the final phase a sampling rate of 100-200 Hz can be utilized.

FIG. 4 illustrates a methodology 400 for utilizing predictive guidance to steer an interceptor to a target. At 410, steering of the interceptor is initiated based upon a predictive guidance process. As previously mentioned, the predictive guidance process can be utilized during a predictive phase of a trajectory being utilized to guide the interceptor to the target.

At 420, the current position of the target and the current position of the interceptor can be obtained, along with any previous position(s) to enable respective trajectories to be generated (e.g., extrapolated). The current positions can be received at the interceptor in navigation data sent from a remotely located system, e.g., a remotely located radar system. The current positions can be received at a guidance system located on the interceptor.

At 430, a future position for the target can be predicted from the current calculated trajectory of the target. Based upon the future position of the target a plurality of future trajectories can be generates from which a future desired trajectory of the interceptor can be determined. As previously mentioned, at any given time, the plurality of trajectories can be generated, and a cost analysis (e.g., analyzing trajectories to determine the optimal trajectory with highest probability of target interception) can be conducted to select the desired trajectory with the preferred cost. The plurality of trajectories can be generated and processed by the guidance system.

At 440, a motor(s) powering the interceptor during the predictive phase can be ignited, e.g., in response to a control signal generated by the guidance system, wherein the control signal can include such control parameters as thrust angle, thrust duration, etc., to steer the interceptor along the chosen trajectory (e.g., desired trajectory). After a period of time from ignition of the motor, operation of the motor can be ceased (shut down) such that the interceptor continues follows the trajectory in free flight based upon its momentum.

At 450, a determination can be made by the guidance system as to whether the interceptor is within range (e.g., kill distance) of the target. In response to the guidance system determining that the target is in range, at 460, the predictive guidance process can be terminated, and a parallel guidance process is initiated to steer the interceptor to intercept the target. As previously mentioned, the parallel guidance process can form part of a final phase of the trajectory.

At 450, in response to the guidance system determining that the interceptor is not within range of the target, the methodology can return to 420 wherein the current position of the target and the interceptor are obtained and a new trajectory (or trajectories), e.g., a corrective trajectory, can be generated. The motor can be reignited to power the interceptor over the new trajectory, or another motor included in the interceptor can be utilized. The methodology of trajectory correction can be performed until the interceptor intercepts the target.

FIG. 5 illustrates a methodology 500 for utilizing predictive guidance to steer an interceptor to a target. At 510, steering of the interceptor is initiated based upon a predictive guidance process (e.g., as utilized by guidance system onboard the interceptor). As previously mentioned, the predictive guidance process can be utilized during a predictive phase of a trajectory being utilized to guide the interceptor to the target. A baseline trajectory (e.g., trajectory $X_0$) can be generated for interception of the target by the interceptor, wherein the baseline trajectory has at least one cost function associated therewith. For example, as previously described, the at least one cost function can be a miss in the X-axis, a miss in the Y-axis, an altitude for interception, an angle of approach for interception (e.g., in accordance with a position of the sun, a line of sight of an onboard sensor, etc.), etc. In another embodiment, the baseline trajectory can be propagated forward given a nominal set of parameters (as determine from a previous predictive guidance computation). The cost function can have a plurality of adjustable parameters associated therewith, e.g., thrust magnitude, thrust direction, thrust duration, etc., as previously mentioned.

At 520, a plurality of other possible trajectories can be generated (e.g., by the guidance system) by propagating based on perturbations of each adjustable parameter to obtain trajectories $x_1$-$x_n$ where there are n adjustable parameters. From the plurality of possible trajectories it is possible to determine how variation in one or more parameters comprising the set of parameters $x_1$-$x_n$ affects the cost function.

At 530, from the plurality of possible trajectories a trajectory having a desired value(s) (e.g., lowest value) for the cost function(s) can be identified (e.g., by the guidance system). For example, the desired value is a low miss distance in the X-axis, or the Y-axis.

At 540, the trajectory having the desired cost function value is selected (e.g., by the guidance system).

At 550, one or more flight conditions, e.g., thrust magnitude, thrust direction, fuel valve open/close, etc., can be identified for the selected trajectory and applied to the interceptor to enable steering the interceptor 100 on the selected trajectory, $x_{applied}$. Identification and application of the one or more flight conditions can be performed by the guidance system.

At 560, a determination can be made by the guidance system as to whether the interceptor is within range (e.g., kill distance) of the target. In response to the guidance system determining that the target is in range, at 570 the predictive guidance process can be terminated, and a parallel guidance process is initiated to steer the interceptor to intercept the target. As previously mentioned, the parallel guidance process can form part of a final phase of the trajectory.

At 560, in response to the guidance system determining that the interceptor is not within range of the target, the methodology can flow to 580 wherein the new trajectory, $x_{applied}$, is configured to be the baseline trajectory, $X_0$, and the methodology returns to 520 for a new set of possible trajectories to be generated based upon the new baseline trajectory, as previously described.

It is to be appreciated that while the various embodiments presented herein are directed towards predictive guidance of an interceptor, the embodiments can be directed towards any suitable system. For example, an aircraft where a cost function is the minimization of fuel usage. During flight advantage can be taken of a flight condition, e.g., wind updraft, wherein during flight the aircraft can encounter a thermal which causes the aircraft to rise above a designated flight altitude. From the elevated position, fueling of the aircrafts engines can be temporally ceased or cut back to a less-than-normal operating condition and the aircraft can coast in a manner similar to that of the interceptor 100 during a coast portion of the trajectory, thereby enabling the plane to travel to its destination with a lower thrust profile.

It is to be appreciated that while the interceptor 100 presented in FIG. 1 (and FIG. 2) comprises a single motor 112, any number of motors can be utilized for the various embodiments presented herein and are considered to be within the scope of the hereto appended claims and are not limited to the various examples presented herein. For example, an interceptor can comprise three motors, wherein each respective motor is assigned to a respective phase in a trajectory. For example, a first motor (first stage motor) is utilized for the initial phase, a second motor (second stage motor) is utilized for the predictive phase, and a third motor (third stage motor) is utilized for the final phase, as operation of each motor is completed (or ceased), the motor can be jettisoned from the interceptor. Hence, during the final phase only the third motor and the warhead are being guided to the target by the onboard guidance system. In another embodiment, a plurality of motors can be utilized for a single phase, e.g., two or more motors can be utilized during the predictive phase, wherein a first motor can be powered for a first portion of the predictive phase until the fuel for the first motor is depleted, wherein a second motor is utilized for a second portion of the predictive phase, wherein upon depletion of fuel for the second motor the interceptor undergoes coasting flight until initiation of the final phase (e.g., powered by the same second motor or by a third motor). In another embodiment, an interceptor comprising two motors can be utilized, wherein the first motor powers the launch phase and the second motor powers the predictive phase and the final phase, operation of the second motor can be initiated at the start of the predictive phase, then temporarily halted for the interceptor to undergo coasting flight, whereupon the second motor is reignited to enable propulsion of the interceptor during the final phase.

Further, fuel for a motor can be compartmentalized, wherein a first portion of solid fuel in a first compartment can be utilized to fuel a motor for the powered portion of the predictive phase and a second portion of solid fuel in a second compartment can be utilized to fuel the motor for the powered final phase. In other embodiments, where liquid fuel systems are utilized, one or more valves can be utilized (e.g., opened, closed) as required to enable fuel delivery to a single motor that is to be ignited more than once. Accordingly, any number of motors can be utilized for one or more of the trajectory phases.

Figure 6:
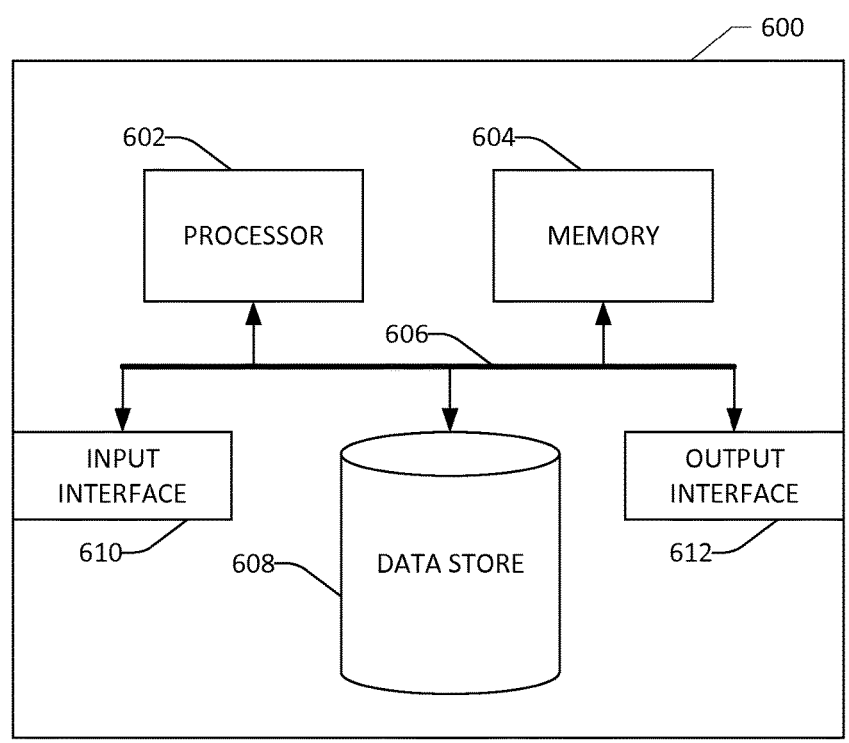
FIG. 6 illustrates an exemplary computing device.

Referring now to FIG. 6, a high-level illustration of an exemplary computing device 600 that can be used in accordance with the systems and methodologies disclosed herein is illustrated. For instance, the computing device 600 can be utilized to enable predictive guidance of an interceptor. For example, computing device 600 can operate as the guidance system 150. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store operating parameters, required operating parameters, and so forth.

The computing device 600 additionally includes a data store 608 that is accessible by the processor 602 by way of the system bus 606. The data store 608 may include executable instructions, operating parameters, required operating parameters, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc., by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An interceptor comprising:
   a motor, wherein the motor generates thrust for the interceptor;
   a processor; and
   memory that comprises instructions that, when executed by the processor, cause the processor to perform acts comprising:
   computing a trajectory of a target at a future point in time;
   computing a plurality of potential trajectories of the interceptor at a future point in time based on a position of the interceptor and the computed trajectory of the target;
   determining a zero effort miss value for each of the trajectories in the plurality of trajectories;
   computing a first control signal for a desired trajectory of the interceptor based upon the zero effort miss values; and
   transmitting the first control signal to the motor, wherein the first control signal causes the motor to deliver thrust responsive to receipt of the first control signal, the first control signal configured to cause the interceptor to have the desired trajectory at the future point in time.

2. The interceptor of claim 1, wherein the desired trajectory is one of the plurality of trajectories, the acts further comprising:
   comparing the respective zero effort miss values for the trajectories in the plurality of trajectories;
   determining, based upon the zero effort miss value comparisons, the desired trajectory has a lowest zero effort miss value; and
   selecting the desired trajectory for computation of the first control signal.

3. The interceptor of claim 1, wherein the desired trajectory is a zero effort miss trajectory.

4. The interceptor of claim 3, wherein the desired trajectory is computed during a predictive phase portion of a trajectory being traversed by the interceptor, wherein the predictive phase is subsequent to an initial phase of the traversed trajectory and is prior to a final phase of the traversed trajectory.

5. The interceptor of claim 4, the acts further comprising:
   terminating control of the interceptor with the first control signal at a transition from the predictive phase to the final phase.

6. The interceptor of claim 5, the acts further comprising:
   generating a second control signal to control flight of the interceptor during the final phase; and
   transmitting the second control signal to the motor, wherein the second control signal causes the motor to deliver thrust responsive to receipt of the second control signal, the second control signal configured to cause the interceptor to intercept the target.

7. The interceptor of claim 6, wherein the motor comprises at least a first stage motor and a second stage motor, wherein the first control signal is transmitted to the first stage motor and the second control signal is transmitted to the second stage motor.

8. The interceptor of claim 4, wherein a portion of the desired trajectory includes a portion of unpowered flight.

9. The interceptor of claim 4, wherein the acts further comprising:
   determining a distance between the interceptor and the target;
   comparing the distance with an operational range of a sensor located on the interceptor; and
   determining, based upon comparison of the determined distance and the operational range of the sensor, that the distance between the interceptor and the target has a magnitude enabling the predictive phase to end and the final phase to be initiated, wherein during the final phase, guidance of the interceptor to the target is based upon a signal generated by the sensor, wherein the sensor signal is a direction to the target.

10. The interceptor of claim 4, wherein during the predictive phase the processor is operating with a first sample rate and during the final phase the processor is operating with a second sample rate, wherein the first sample rate is slower than the second sample rate.

11. The interceptor of claim 9, wherein the first sample rate is about 1 Hertz and the second sample rate is about 100-200 Hertz.

12. The interceptor of claim 1, the acts further comprising receiving a navigation signal from a remotely located radar system, wherein the navigation signal includes at least one of a current position of the target or a current position of the interceptor.

13. A method comprising:
   computing a trajectory of a target at a future point in time, wherein the target is to be intercepted by an interceptor;
   computing a plurality of potential trajectories of the interceptor at a future point in time based on a position of the interceptor and the computed trajectory of the target;
   determining a zero effort miss value for each of the trajectories in the plurality of trajectories;
   computing a first control signal for a desired trajectory of the interceptor based upon the zero effort miss values; and
   transmitting the first control signal to a motor, wherein the first control signal causes the motor to deliver thrust to the interceptor responsive to receipt of the first control signal, the first control signal configured to cause the interceptor to have the desired trajectory at the future point in time.

14. The method of claim 13, wherein the desired trajectory is one of the plurality of trajectories, the method further comprising:
   comparing the respective zero effort miss values for the trajectories in the plurality of trajectories;
   determining, based upon the zero effort miss value comparisons, the desired trajectory has the lowest zero effort miss value; and
   selecting the desired trajectory for computation of the first control signal.

15. The method of claim 13, wherein the desired trajectory is a zero effort miss trajectory.

16. The method of claim 15, wherein the desired trajectory is computed during a predictive phase portion of a trajectory being traversed by the interceptor, wherein the predictive phase is subsequent to an initial phase of the traversed trajectory and is prior to a final phase of the traversed trajectory.

17. The method of claim 16, further comprising:
   determining a distance between the interceptor and the target;
   comparing the distance with an operational range of a sensor located on the interceptor;
   determining, based upon comparison of the determined distance and the operational range of the sensor, that the distance between the interceptor and the target has a magnitude enabling the predictive phase to end and the final phase to be initiated;
   generating a second control signal, the second control signal generated in response to determining the final phase is to be initiated, the second control signal is generated based upon a direction to the target provided by the sensor; and
   transmitting the second control signal to the motor, wherein the second control signal causes the motor to deliver thrust responsive to receipt of the second control signal, the second control signal configured to cause the interceptor to intercept the target.

18. The method of claim 16, wherein during the predictive phase a processor is operating with a first sample rate to compute the desired trajectory of the interceptor, and during the final phase the processor is operating with a second sample rate, wherein the first sample rate is slower than the second sample rate.

19. The method of claim 18, wherein the first sample rate is about 1 Hertz and the second sample rate is about 100-200 Hertz.

* * * * *